(12) United States Patent
Mansour et al.

(10) Patent No.: US 6,578,052 B1
(45) Date of Patent: Jun. 10, 2003

(54) DATABASE CLEAN-UP SYSTEM

(75) Inventors: Peter M. Mansour, Seattle, WA (US); Roman Sherman, Bellevue, WA (US); David C. Whitney, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 0 days.

(21) Appl. No.: 09/407,828

(22) Filed: Sep. 28, 1999

(51) Int. Cl.$^7$ ................................................ G06F 17/30
(52) U.S. Cl. .......................... 707/200; 707/1; 707/201; 707/206
(58) Field of Search .............................. 707/1, 10, 200, 707/206; 709/206, 207, 202, 203; 455/466

(56) References Cited

U.S. PATENT DOCUMENTS 6,088,720 A * 7/2000 Berkowitz et al. ........... 709/206
6,324,569 B1 * 11/2001 Ogilvie et al. ............... 709/206

\* cited by examiner

*Primary Examiner*—Sanjiv Shah
(74) *Attorney, Agent, or Firm*—Merchant & Gould P.C.

(57) ABSTRACT

A clean-up system recaptures part of the memory or secondary storage space on a client device, such as a handheld personal computer. E-mail messages are organized in a hierarchy of folders within a database. Each folder may or may not contain e-mail messages. A user downloads e-mail messages from a server to the client device. The user marks any folders that he wishes to use upon disconnect from the server for off-line use. Upon disconnect from the server, the clean-up system begins with the first e-mail message in the database. A test module determines if the e-mail message is linked to a folder in the service hierarchy to be cleaned-up. If the message is linked to a folder in the service hierarchy to be cleaned-up, an off-line module determines if the folder is marked for off-line use. If the folder is marked for off-line use, the message linked to the folder is retained for later use. If the folder is not marked for off-line use, a delete module deletes the message linked to the folder, recapturing part of the memory or secondary storage space on the client device. This routine is repeated for each and every message within the database.

12 Claims, 7 Drawing Sheets

DATABASE CLEAN-UP SYSTEM

TECHNICAL FIELD

The present invention relates to personal computers and more particularly to a system running on a handheld computer, such as a Handheld PC or a Palm-size PC, for deleting unneeded data.

BACKGROUND OF THE INVENTION

Usually, a user will use a primary client device, such as a desktop personal computer, to access his e-mails held on a server. Sometimes, the user will use a secondary client device, such as a handheld computer that is mobile, to access his e-mails. Typically, the user stores his e-mails within folders of a hierarchy of folders. While connected to the server, a Handheld PC user can download e-mails by selecting the folders into which the user wishes to download e-mails. During this process, a large number of e-mails may be downloaded by the user as the user selects all or some of the folders in the hierarchy contained on the server.

Typically, all of the e-mails, that are downloaded, are retained on the client device, either the primary or the secondary, even after disconnecting from the server. Retaining all of the downloaded e-mails after disconnection from the server uses up valuable storage space. This is particularly a problem when the e-mails are downloaded to a handheld computer because memory and secondary storage space is limited in handheld computers.

SUMMARY OF THE INVENTION

In one aspect of the present invention, a method of selectively deleting messages linked to folders in a flat database on a client device is provided. The folders are arranged in an emulated hierarchy and have a service root associated with a specific server or e-mail service. The method includes marking folders containing messages to be retained with a first flag; determining if a folder is in the hierarchy belonging to the service root; and deleting a message linked to a folder in the hierarchy belonging to the service root and not marked with the first flag.

In another aspect of the present invention, a computer program storage medium readable by a computing system and encoding a computer program of instructions for executing a computer process for selectively deleting messages linked to folders in a flat database on a handheld computer is disclosed. The folders are arranged in an emulated hierarchy and have a service root associated with a server. The computer process includes indicating folders that contain messages to be retained for use after disconnection from the server with an off-line flag by the handheld computer; determining of a folder is in the hierarchy belonging to the service root; and deleting a message linked to a folder in the hierarchy belonging to the service root and not marked with the off-line flag.

In another aspect of the present invention, a computer data signal embodied in a carrier were readable by a computing system and encoding a computer program of instructions for executing a computer process for selectively deleting messages linked to folders in a flat database on a client device is disclosed. The folders are arranged in an emulated hierarchy and have a service root associated with a server. The computer process is analogous to that described above.

Another aspect of the present invention includes an apparatus for selectively deleting messages linked to folders in a flat database on a client device. The folders are arranged in an emulated hierarchy and have a service root associated with a specific server or e-mail service. The apparatus includes an off-line module, a decision module, and an erase module. The off-line module marks folders containing messages to be retained with an off-line flag. The decision module determines if a folder is in the hierarchy belonging to the service root. The erase module deletes a message linked to a folder in the hierarchy belonging to the service root and not marked with the first flag.

A more complete appreciation of the present invention and its scope may be obtained from the accompanying drawings, which are briefly described below, from the following detailed descriptions of presently preferred embodiments of the invention and from the appended claims.

DETAILED DESCRIPTION OF THE INVENTION

In general, the present disclosure describes a clean-up system for recapturing part of memory or secondary storage space on a personal computer. The present disclosure has been found to be particularly advantageous for recapturing memory or secondary storage space on handheld computers where memory and secondary storage space are limited. In particular, the clean-up system involves searching for data, for example, e-mail messages that are linked to folders that are within a specific service hierarchy to be cleaned-up and are not marked for off-line use. If a folder is in the specific service hierarchy and is not marked for off-line use, the clean-up system deletes the data linked to that folder.

Figure 1:
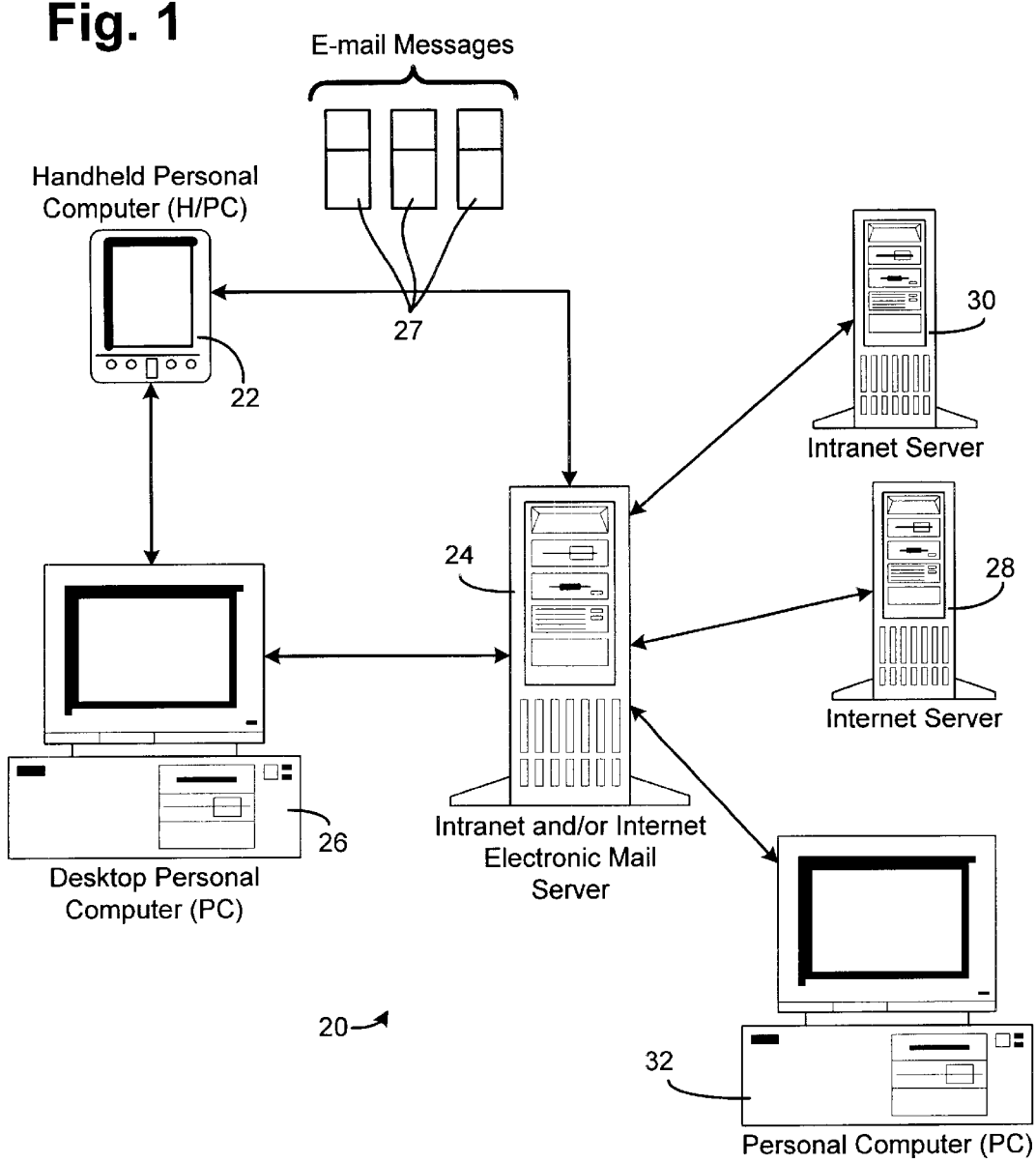
FIG. 1 is a schematic representation of a client/server computer network incorporating an e-mail server computer connected to a handheld client computer, according to the present disclosure.

FIG. 1 is a schematic representation of a client/server computer network exemplary of the environment for the present invention. A client/server network system 20, including a client computing system 22, such as a handheld personal computer, is connected to a server computing system 24, such as an Intranet or Internet Electronic Mail Server. The client computer system 22 preferably includes an operating system capable of carrying out the operations of the present disclosure.

The handheld personal computer 22 is also connectable to a computing system 26, such as a desktop personal computer as a companion device, wherein the desktop personal computer connects to the server 24. The server 24 sends and receives electronic items such as electronic mail messages (e-mail) 27 through various connections or gateways to other computing systems, such as an Internet server 28, an Intranet server 30, or another desktop personal computer 32. The server 24 receives e-mail messages from the other computing systems 28, 30, and 32 and stores the e-mail messages for the user of the handheld personal computer 22 and the desktop personal computer 26 in an account dedicated to that user. Typically, the user uses the desktop personal computer 26 as the primary client device and the handheld personal computer 22 as the secondary client device.

The e-mail server 24 communicates with the various computers 22, 26, 28, 30, and 32 using specific protocols, i.e., rules governing the type and form of communications. For example, the e-mail server 24 may communicate with the handheld personal computer 22 using either a Post Office Protocol (POP) or an Internet Message Access Protocol (IMAP) or some other protocol.

The handheld personal computer 22 has software that selectively retrieves server-based items, such as the e-mail messages 27, based on predetermined criteria. For example, a user of the handheld personal computer 22 selects a folder in a hierarchy of folders to download the e-mail messages 27 for that folder from the server 24.

Figure 2:
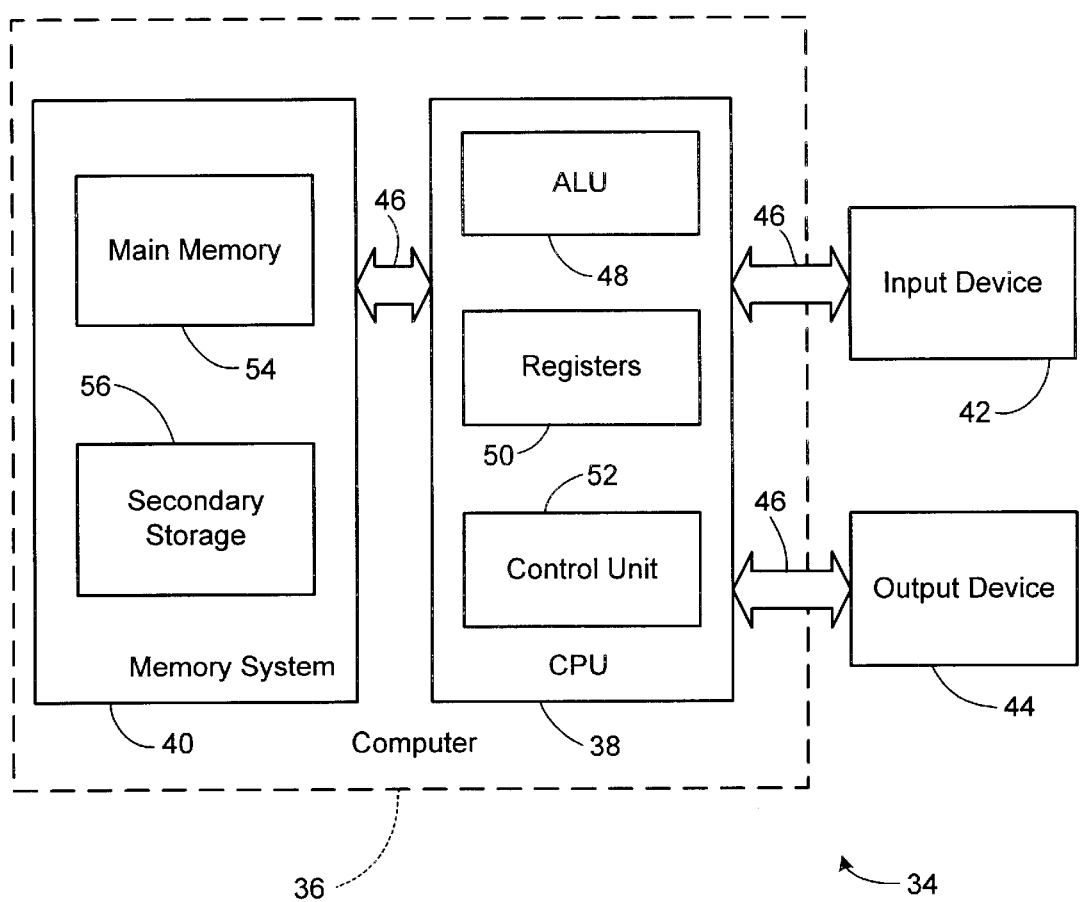
FIG. 2 is a schematic representation showing the handheld computer system of FIG. 1 that may be used to implement aspects of the present disclosure.

FIG. 2 and the following discussion are intended to provide a brief general description of a suitable computing environment in which the invention may be implemented. Although not required, the invention is described in the general context of computer executable instructions of programs being executed by a handheld computer.

The handheld personal computer 22, FIG. 1, incorporates a system 34 of resources for implementing an embodiment of the invention as shown in FIG. 2. The system 34 incorporates a computing system 36 having at least one central processing unit (CPU) 38, and a memory system 40. The memory system 40, an input device 42, and an output device 44 are coupled to the CPU 38 by at least one system bus 46.

The CPU 38 is of conventional design and includes an Arithmetic Logic Unit (ALU) 48 for performing computations, a collection of registers 50 for temporary storage of data and instructions, and a control unit 52 for controlling operation of the system 34. The CPU 38 may be a microprocessor having any of a variety of architectures including, but not limited to, those architectures currently produced by Intel, Cyrix, AMD, IBM, and Motorola.

The memory system 40 includes a main memory 54, in the form of media such as random access memory (RAM), including a cache, and read only memory (ROM), and may incorporate a secondary storage 56 in the form of long term storage mediums such as hard disks, floppy disks, tapes, compact disks (CDs), flash memory, and the like and other devices that store data using electrical, magnetic, optical, or other recording media. The main memory 54 may also include video display memory for displaying images through the output device 44, such as a display device, i.e., a monitor. The memory 40 can include a variety of alternative components having a variety of storage capacities, such as magnetic cassettes memory cards, video digital disks, Bernoulli cartridges, random access memories, read only memories, and the like. Memory devices within the memory system 40 and their associated computer readable media provide non-volatile storage of computer readable instructions, data structures, programs, and other data for the computing system 34.

The system bus 46 may be any of several types of bus structures such as a memory bus, a peripheral bus, or a local bus using any of a variety of bus architectures.

The input device 42 can include a keyboard, a mouse, a microphone, a touch pad, a touch screen, or the like. The output device 44 can include a display, a printer, a speaker, a touch screen, or the like. Some devices, such as a network interface or a modem, can be used as input or output devices 42 or 44. The input and output devices 42, 44 are connected to the computer 36 through the system bus 46.

The computer system 34 further includes an operating system and usually one or more application programs. The operating system includes a set of programs that control the operation of the system 34, control the allocation of resources, provide a graphical user interface to the user, and may also include accessory and utility programs. An example of an operating system that can run on the handheld personal computer is the "WINDOWS CE" brand operating system that is commercially available from Microsoft Corporation. An application program is software that runs on top of the operating system software and uses computer resources made available through the operating system to perform application specific tasks desired by the user.

The logical operations of the various embodiments of the present invention are implemented as a sequence of computer implemented steps running on a computing system or as interconnected machine modules within the computing system. The implementation is a matter of choice dependent on the performance requirements of the computing system implementing the invention. Accordingly, the logical operations making up the embodiments of the present invention described herein are referred to alternatively as operations, steps, or modules.

Figure 3:
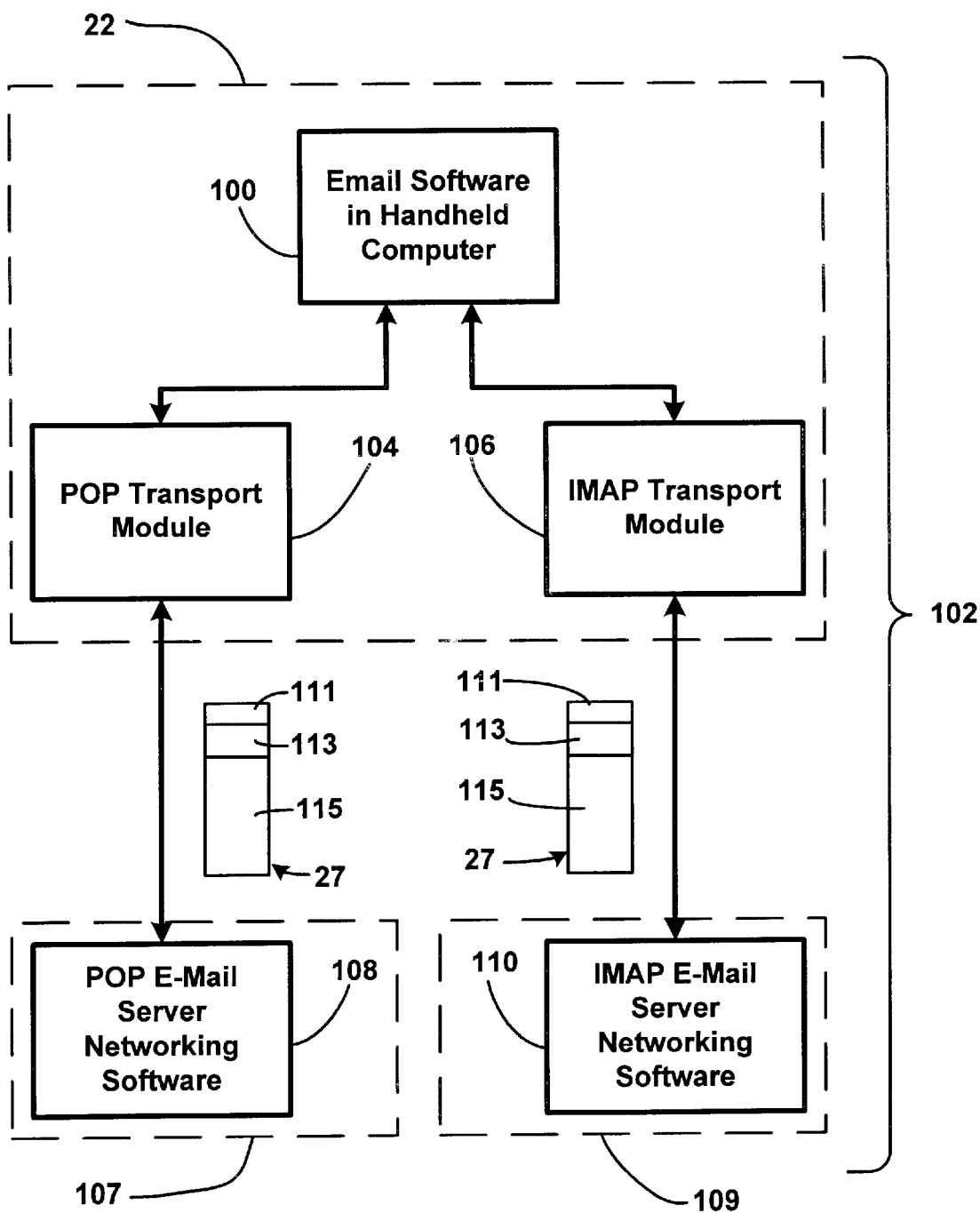
FIG. 3 is a schematic representation showing the software environment of the client/server network shown in FIG. 1; the environment including software of the present disclosure, a POP module and an IMAP module, and networking software located on the server shown in FIGS. 1 and 2.

In a preferred embodiment of the present invention illustrated in FIG. 3, the software 100 is an application program that runs on top of an operating system such as the Microsoft Windows CE operating system running on the handheld personal computer 22, FIG. 1. The e-mail software 100 works directly with communication software known as transport modules 104, 106. One module is a POP transport module 104 and another is an IMAP transport module 106. The POP transport module 104 is a network communications layer designed specifically to communicate with POP communications software 108 located on a POP e-mail server 107. The POP server 107 is a particular embodiment of the server 24 depicted in FIG. 1. Alternatively, the software 100 communicates with the IMAP transport module 106 that is a network communication layer designed to communicate with IMAP software 110 on an IMAP e-mail server 109. The IMAP server 109 is another embodiment of the server 24 depicted in FIG. 1. In alternative embodiments, other transport modules could be used.

Depending on whether the handheld personal computer 22 is configured to communicate with the POP server 107 or the IMAP server 109, a transport module 104 or 106, respectively, is used. Of course, other computer configurations for other transport modules could be used. The user configures the handheld personal computer 22, FIG. 1, to communicate based on its particular e-mail account and the protocol employed by the e-mail server 24, FIG. 1. However, with respect to the software 100, the requests, commands, and responses are the same regardless of which transport module 104 or 106 is used.

The software 100 sends command requests to the transport module 104 or 106 requesting actions be performed by the server 107 or 109. Such actions might include a command to return server based items such as e-mail messages. When a request is received by the transport module 104 or 106, the transport module 104 or 106 converts the command into data signals that are sent to the e-mail server 107 or 109 over the network connection. The e-mail server 107 or 109, and its networking software 108 or 110, receives these data signals, compiles the signals, analyzes the signals, and performs the requested operations in response to the signals. Once the e-mail server 107 or 109 performs the operations, the server 107 or 109 returns information to the transport module 104 or 106 either acknowledging the operation was completed successfully or that an error occurred.

The response from the e-mail server 107 or 109 might also include the data requested by the software 100. The response is in the form of data signals that are sent to the transport module 104 or 106, which compiles the data signals into a meaningful response and transports the response to the software 100. The software 100 is then able to parse and use the response accordingly.

The subjects of the requests from the software 100 to the e-mail server 107 or 109 relate to e-mail messages 27, FIG. 1. Each e-mail message 27 is an electronic document that is made up of at least three elements, an identification element (ID) 111, header information 113, and a message body 115. The ID 111 is used internally by the handheld personal computer 22, FIG. 1, or the server 24, FIG. 1, to identify the file and may be simple, such as an integer, or more complex, such as a file name or other ID string. The header 113 has information about the e-mail message 27, such as originator, addressee, time created, and the subject of the e-mail message 27. The header 113 may include other fields. The body 115 is the actual message created by the creator of the e-mail message 27 and may include text, graphics, other files, or attachments.

Figure 4:
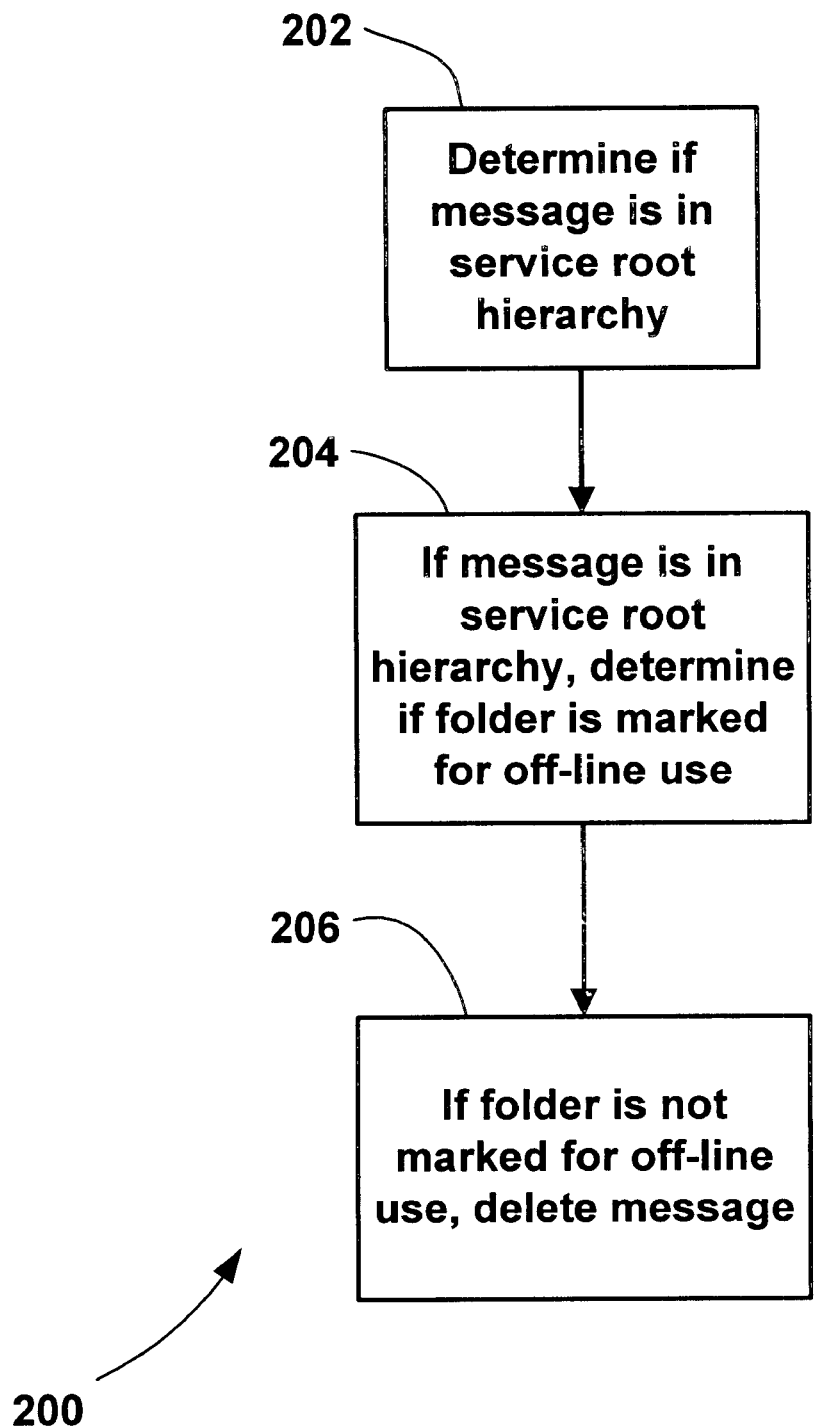
FIG. 4 is a schematic, block diagram depicting the basic functions of a clean-up system, according to the present disclosure.

FIG. 4 is a preferred embodiment of the basic operations of a clean-up system 200 according to the present invention for recapturing part of the memory or secondary storage space on a client device, such as a handheld personal computer. The e-mail messages 27, FIG. 1, are organized in a hierarchy of folders within a database. Each folder may or may not contain e-mail messages 27. Preferably, a user downloads e-mail messages 27 from the server 24, FIG. 1, to the client device 22, FIG. 1, by selecting the folder into which the user wishes to download e-mail messages 27. The user marks any folders he wishes to use upon disconnect from the server for off-line use. Upon disconnect from the server, the clean-up system 200 is executed on the client device 22.

The clean-up system 200 begins with the first e-mail message in the database. A test module 202 determines if the e-mail message is linked to a folder in the service hierarchy root, i.e., a folder that is a sub-folder of the service root folder, to be cleaned-up. If the message is linked to a folder that is a sub-folder of the service root folder to be cleaned-up, an off-line module 204 determines if the folder is marked for off-line use. If the folder is marked for off-line use, the message linked to the folder is retained for later use. If the folder is not marked for off-line use, a delete module 206 deletes the message linked to the folder, recapturing part of the memory or secondary storage space on the client device. This routine is repeated for each and every message within the database.

Figure 5:
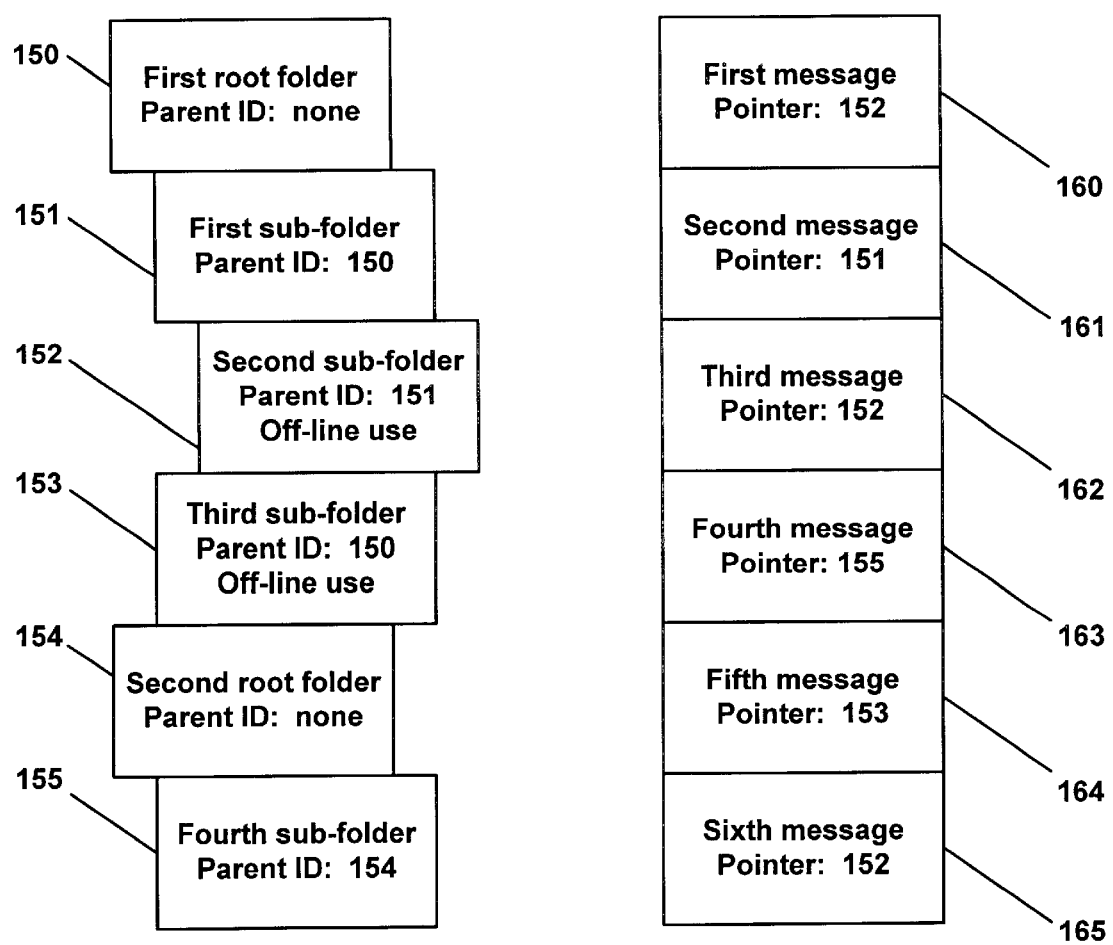
FIG. 5 is a schematic representation of a flat database having an emulated hierarchical structure, according to the present disclosure.

In general, there are two types of databases for storing e-mail messages 27: a hierarchical database and a flat database, which includes data structure sufficient to emulate a hierarchy. FIG. 5 is a schematic representation of a flat database. In a true hierarchical database, each folder of the hierarchy contains links or pointers to its sub-folders, or children, and to its root folder, or parent. In addition, each folder contains links or pointers to each message within the folder. In a hierarchical database, finding messages contained with one folder is relatively fast because there are pointers pointing to each message contained within the folder. In contrast, parsing through all the messages in the database is relatively slow because each folder must be parsed to find the messages contained within that folder.

In a flat database the hierarchical structure is emulated. Each folder has a link to its parent but not to its children. In addition, each message has a pointer to its associated folder but the folder does not have a link to the message. In a flat database, finding messages contained within one folder is relatively slow because the folders do not have pointers to the messages; therefore, all the messages must be parsed to find the messages contained within any given folder. Finding messages associated with several folders requires parsing all the messages multiple times. In contrast, parsing through all the messages in the database is relatively fast because the messages are not contained within the folders.

Referring now to FIG. 5, a first root folder 150; first, second, and third sub-folders 151, 152, 153; a second root folder 154; and a fourth sub-folder 154 are depicted. The folders 150–155 depicted in FIG. 5 have an emulated hierarchy. The first root folder 150 has a first sub-folder 151. The first sub-folder 151 has a second sub-folder 152. The first root folder 150 also has a third sub-folder 153. The second root folder 154 has a fourth sub-folder 155. The first sub-folder 151 has a pointer to the first root folder 150. Note that the first root folder 150 does not have a pointer to the first sub-folder 151. The second sub-folder 152 has a pointer to the first sub-folder 151. The third sub-folder 153 has a pointer to the first root folder 150. The fourth sub-folder 155 has a pointer to the second root folder 154.

First, second, third, fourth, fifth, and sixth messages 160–165 are also depicted. The first message 160 has a pointer to the second sub-folder 152. Note that the second sub-folder 152 does not have a pointer to the first message 160. The second message 161 has a pointer to the first sub-folder 151. The third message 162 has a pointer to the second sub-folder 152. The fourth message 163 has a pointer to the fourth sub-folder 155. The fifth message 164 has a pointer to the third sub-folder 153. The sixth message 165 has a pointer to the second sub-folder 152.

Figure 6:
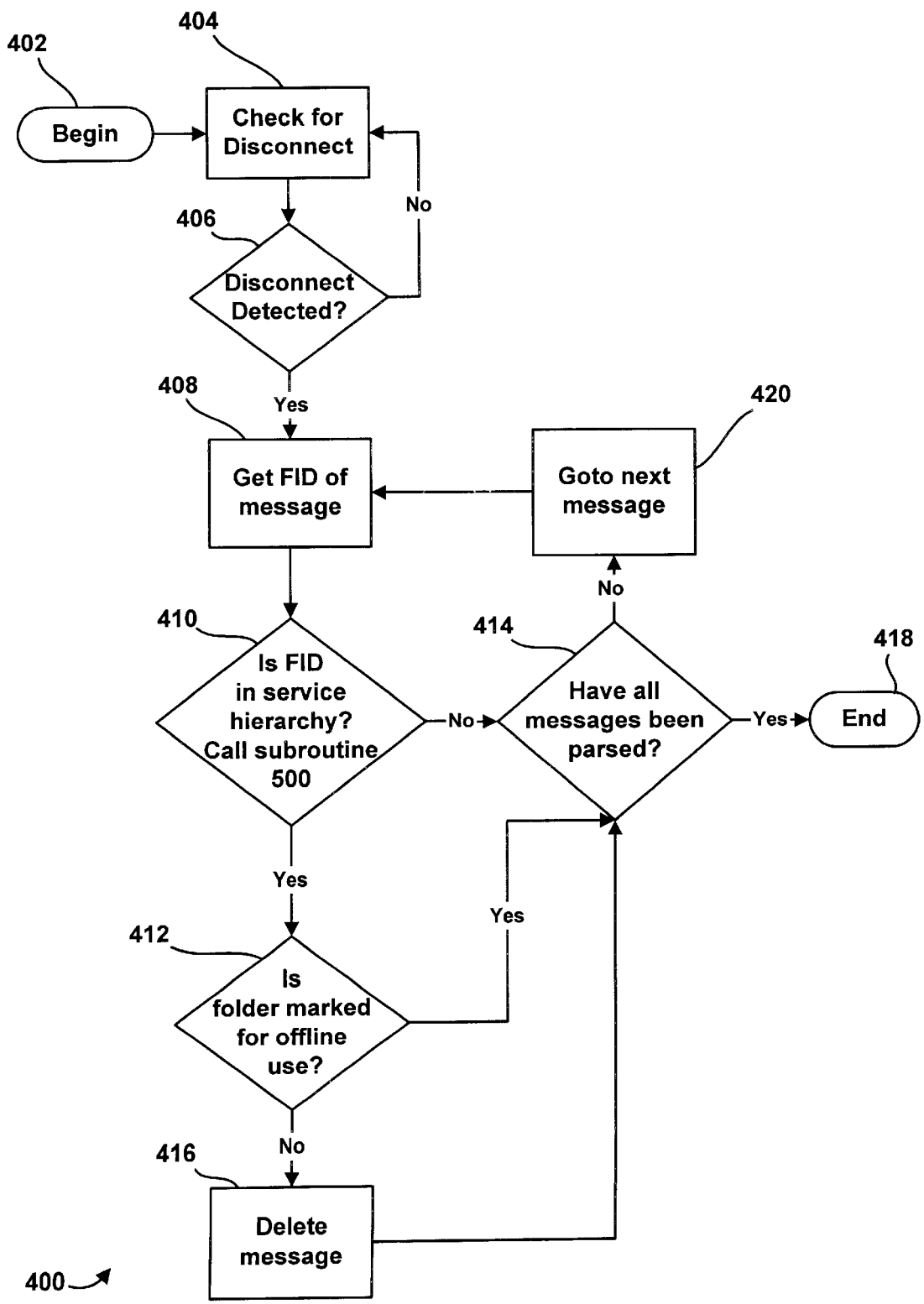
FIG. 6 is a flow chart representing logical operations of a clean-up system for recapturing part of the memory or secondary storage space of a personal computer, according to the present disclosure.
Figure 7:
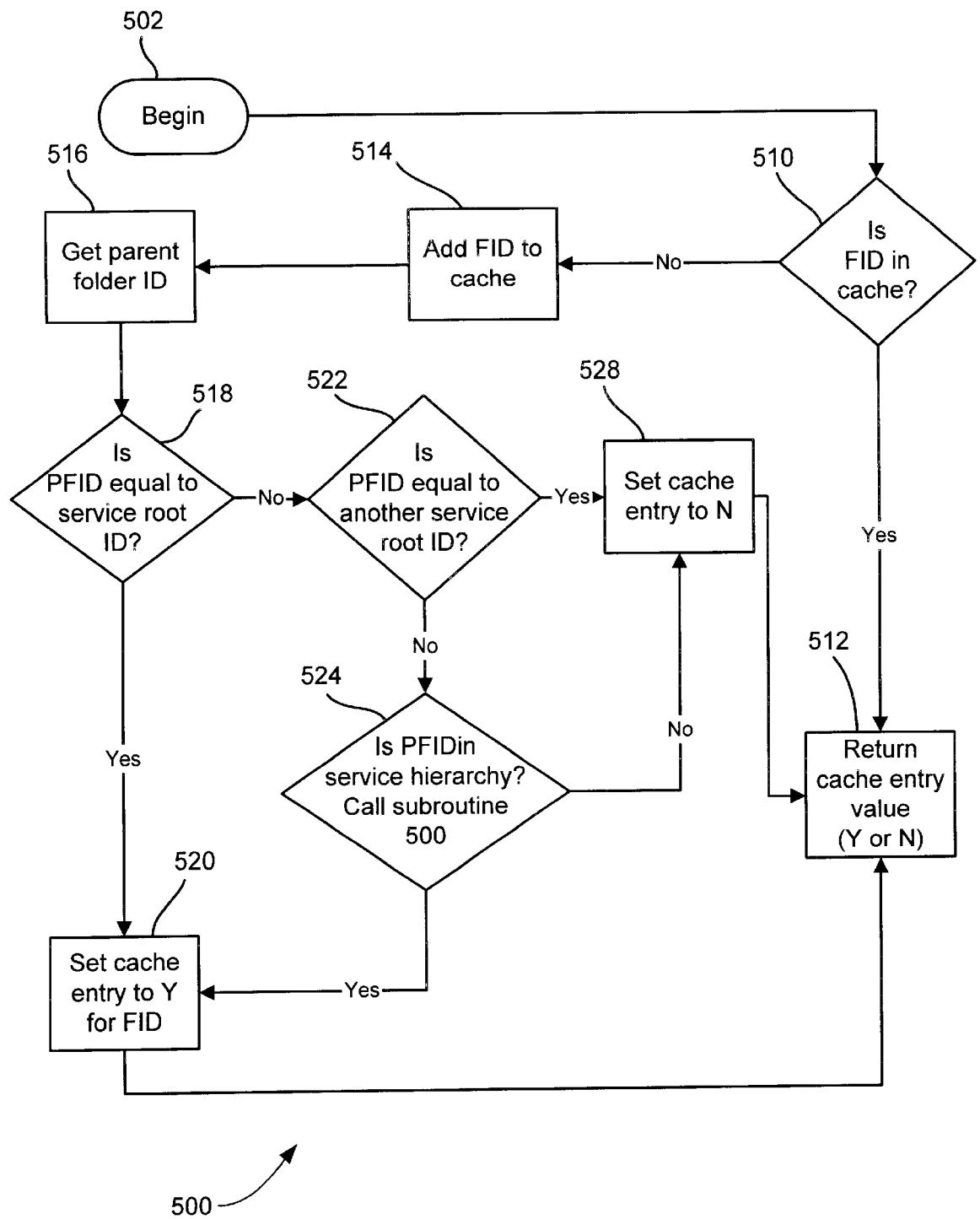
FIG. 7 is a flow chart continuing from the flow chart of FIG. 6 representing logical operations of a clean-up system for recapturing part of the memory or secondary storage space of a personal computer, according to the present disclosure.

FIGS. 6 and 7 are flow charts representing logical operations of a clean-up system 400 for cleaning up or recapturing part of the memory or secondary storage space of a client device and more particularly a handheld computer using a flat folder database emulating a hierarchy. The clean-up system 400 parses each message in the database. For each message, it determines if the message is in a folder that is a sub-folder of the service hierarchy root. Once a folder has been examined, the folder ID, along with a "Y" or "N" value corresponding to whether the folder is in the service hierarchy, is cached for faster retrieval during subsequent parsing.

Entrance to the operational flow of the clean-up system 400 begins at a flow connection 402. A monitor module 404 checks for a disconnection between the client device and the server. A disconnection is detected whenever the client device and the server stop communicating with each other. This may be due to disconnection from the server through normal protocols, by disconnecting a hard connection to the server, i.e., unplugging the network connection, or by some other interruption in communication between the client device and the server. A disconnect detect operation 406 tests whether a disconnection has been detected. If the client device and the server are still communicating, the operational flow branches "NO" to the monitor module 404. If the client device and the server are not connected, the operational flow branches "YES" to a find operation 408.

It should be noted that the clean-up system 400 is activated in response to a disconnection between the client device and the server at the disconnect detect operation 406. Once the operations are completed, the clean-up system 400 does not restart until the next disconnect at the disconnect detect operation 406. While the user is off-line, he might move messages, delete messages, unmark folders, and mark folders. When the clean-up system 400 is activated again at the disconnect detect operation 406, the new criteria, i.e. the marking of folders to retain messages and unmarking of folders to delete messages, are parsed according to the operational flow charts depicted in FIGS. 6 and 7.

The find operation 408 gets the folder ID of a message in the database. A decision module 410 determines if the folder ID is in the service hierarchy by calling a subroutine 500. Referring to FIG. 7, the subroutine 500 begins at a flow connection 502. A cache operation 510 determines if the folder ID is in the cache. If the folder ID is in the cache, the operational flow branches "YES" to a return module 512. The return module 512 returns the value in the cache for the folder ID to the decision module 410 of the clean-up system 400, and the operational flow returns to the decision module 410. If the folder ID is not in the cache, the operational flow branches "NO" to an add operation 514. The add operation 514 adds the folder ID to the cache. A get operation 516 gets a parent folder ID for the current folder.

A first service-root module 518 determines if the parent folder ID is equal to an ID of the service hierarchy root of the service hierarchy desired to be parsed. A client device may have several service hierarchies corresponding, for example, to different e-mail services. Upon disconnection, only the service hierarchy corresponding to the service from which the user disconnected is parsed by the clean-up system 400. If the parent folder ID is equal to the service hierarchy root ID being parsed, the operational flow branches "YES" to a set module 520. The set module 520 sets the cache entry for the current folder to "Y." The "Y" entry is a predefined value assigned to indicate that the folder ID is in the service hierarchy.

If the parent folder ID is not equal to the service hierarchy root ID of the service hierarchy being parsed, the operation flow branches "NO" to a second service root module 522. The second service root module 522 determines if the parent folder ID is equal to another service hierarchy root ID. If the parent folder ID is not equal to another service hierarchy root ID, the operational flow branches "NO" to a decision module 524. The decision module 524 calls subroutine 500 to determine if the parent folder ID is in the service hierarchy. It should be noted that in this calling of subroutine 500, the return module 512 will return a resulting value to the decision module 524. In other words, the return module 512 will return a "Y" or "N" value to the module calling the subroutine 500.

If the subroutine 500 determines the parent folder ID is in the service hierarchy, the operational flow branches "YES" to the set operation 520. The set operation 520 sets the cache entry for the current folder ID to "Y." If the subroutine 500 determines the parent folder's ID is not in the service hierarchy, the operational flow branches "NO" to a set operation 528. The set operation 528 sets the cache entry for the current folder to "N." The "N" entry is a predefined value assigned to indicate that the folder ID is not in the service hierarchy. Referring back to the second service root module 522, if the parent folder ID is equal to another service root ID, the operational flow branches "YES" to the set operation 528.

Referring back to FIG. 6, the decision module 410 receives the "Y" or "N" value for the folder ID in the database from the return module 512. If the value is equal to "Y" for the folder ID, the decision module 410 determines that the currently parsed message is in the service hierarchy and the operational flow branches "YES" to the off-line module 412. If the value is equal to "N" for the folder ID, the decision module 410 determines that the currently parsed message is not in the service hierarchy, and the operational flow branches "NO" to a parse module 414.

The off-line module 412 determines if the currently parsed message is in a folder marked for off-line use. If the folder is not marked for off-line use, the operational flow branches "NO" to an erase operation 416. The erase operation 416 deletes the currently parsed message. If the folder is marked for off-line use, the operational flow branches "YES" to the parse module 414. The parse module 414 determines if each and every message in the database has been parsed. If all the messages in the database have been parsed, the operational flow branches "YES" and the clean-up system 400 ends at 418. If not all of the messages in the database have been parsed, the operational flow branches "NO" to a go to operation 420. The goto operation 420 advances the clean-up system 400 to the next message in the database.

The operational flow charts depicted in FIGS. 6 and 7 may best be understood in terms of an application example. Referring now to FIGS. 5, 6, and 7, in one example embodiment, the user has the emulated folder architecture depicted in FIG. 5. The folder architecture was described previously herein. The second sub-folder 152 and the third sub-folder 153 were marked for off-line use by the user. The first root folder 150 is the in-service hierarchy and the second root folder 154 is out of service hierarchy.

The clean-up system 400 begins at 402. The monitor module 404 continually checks for a disconnection between the client device and the server. The disconnect detect operation 406 determines there has been a disconnection. The find operation 408 gets the folder ID (152) of the first message 160. The decision module 410 calls the subroutine 500.

The cache operation 510 determines that the folder ID (152) for the second sub-folder 152 is not in the cache, i.e. a cache "miss." The add operation 514 adds the folder ID (152) for the second sub-folder 152 to the cache. The get operation 516 gets the parent folder ID (151) for the second sub-folder 152. The first service-root module 518 determines that the parent folder ID (151) for the second sub-folder 152 is not equal to the service hierarchy root ID (150) that is being cleaned-up. The second service root module 522 determines that the parent folder ID (151) is not equal to another service hierarchy root ID.

The decision module 524 calls subroutine 500 to determine if the parent folder ID (151) of the second sub-folder 152 is in the service hierarchy that is being cleaned-up. The cache operation 510 determines that the folder ID (151) of the first sub-folder 151 is not in the cache. The add operation 514 adds the folder ID (151) of the first sub-folder 151 to the cache. The get operation 516 gets the parent folder ID (150) for the first sub-folder 151. The first service root module 518 determines the parent folder ID (150) is equal to the service hierarchy root ID that is being cleaned-up. The set module 520 sets the cache entry for the first sub-folder 151 to "Y." The return module 512 returns a "Y" value to the decision module 524. The set operation 520 sets the cache entry for the second sub-folder 152 to "Y." The return module 512 returns a "Y" value to the decision module 410 of FIG. 6.

The off-line module 412 determines the second sub-folder 152 is marked for off-line use. The operational flow proceeds to the parse module 414 and the first message 160 is retained on the client device for later use. The parse module 414 determines that not all the messages have been parsed. The goto operation 420 advances the clean-up system 400 to the second message 161 in the database.

The find operation 408 gets the folder ID (151) of the second message 161. The decision module 410 calls subroutine 500 to determine if the first sub-folder 151 is in the service hierarchy. Referring once again to FIG. 7, the cache operation 510 determines the folder ID (151) of the first sub-folder 151 is in the cache, a cache "hit." The return operation 512 returns "Y" to the decision module 410 since the cache entry for the first sub-folder 151 has already been set to "Y," as described above. In this fashion, caching the folder IDs and their respective "N" or "Y" values eliminates the need to execute the instructions associated with the rest of the subroutine 500, thus speeding up the parsing of all the messages in the database.

The off-line module 412 determines that the second message 161 belongs to a folder not marked for off-line use. The erase operation 416 deletes the second message 161. The parse module 414 determines that not all the messages have been parsed. The goto operation 420 advances the clean-up system 400 to the third message 162 in the database.

The get module 408 gets the folder ID (152) of the third message 162. The decision module 410 calls the subroutine 500. The cache operation 510 determines the folder ID (152) for the second sub-folder 152 is in the cache and returns a "Y" value to the clean-up system 400. The operational flow proceeds from the decision module 410 to the erase operation 416, as described above, for the third message 162, resulting in the third message 162 being deleted. The parse module 414 determines that not all of the messages have been parsed. The goto operation 420 advances the clean-up system 400 to the fourth message 163.

The get module 408 gets the folder ID (155) of the fourth message 163. The decision module 410 calls the subroutine 500. The cache operation 510 determines the folder ID (155) for the fourth sub-folder 155 is not in the cache. The add operation 514 adds the folder ID (155) for the fourth sub-folder 155 to the cache. The get operation 516 gets the parent folder ID (154) for the fourth sub-folder 155. The first service root module 518 determines that the parent folder ID (154) for the fourth sub-folder 155 is not equal to the service hierarchy root ID of the service hierarchy being cleaned-up. The second service root module 522 determines that the parent folder ID (154) for the fourth sub-folder 155 is equal to another service hierarchy root ID. The set operation 528 sets the cache entry for the fourth sub-folder 155 to "N." The return module returns the "N" value to the decision module 410 of FIG. 6. The parse module 414 determines that not all of the messages have been parsed. The goto operation 420 advances the clean-up system 400 to the fifth message 164.

The get module 408 gets the folder ID (153) of the fifth message 164. The decision module 410 calls the subroutine 500. Operational flow proceeds from the cache operation 510 to the set module 520 as described above for the first sub-folder 151, resulting in a "Y" cache entry. The return module 512 returns a "Y" value to the decision module 410 of FIG. 6. Operational flow proceeds from the decision module 410 to the goto operation 420 as described above for the second message 161.

The get module 408 gets the folder ID (152) of the sixth message 165. The decision module 410 calls the subroutine 500. Operational flow proceeds from the cache operation 510 to the erase operation 416 as described above for the third message 162. The parse module 414 determines that all the messages have been parsed, and the operational flow ends at 418.

The various embodiments described above are provided by way of illustration only and should not be construed to limit the invention. Those skilled in the art will readily recognize various modifications and changes that may be made to the present invention without following the example embodiments and applications illustrated and described herein, and without departing from the true spirit and scope of the present invention, which is set forth in the following claims.

What is claimed is:

1. A method of selectively deleting messages linked to folders in a flat database on a client device, the folders being arranged in an emulated hierarchy and having a service root associated with a server, the method comprising:

marking folders containing messages to be retained with a first flag;

determining if a folder is in the hierarchy belonging to the service root; deleting a message linked to a folder in the hierarchy belonging to the service root and not marked with the first flag; and after determining if a folder is in the hierarchy, placing the result of the determination in a cache of the client device.

2. The method according to claim 1, further comprising:

after placing the result, comparing the result in the cache to a predetermined criteria.

3. The method according to claim 2, wherein deleting the message comprises:

deleting the message linked to a folder where the result in the cache is equal to the predetermined criteria and the folder is not marked with the first flag.

4. A method of selectively deleting messages linked to folders in a flat database on a client device, the folders being arranged in an emulated hierarchy and having a service root associated with a server, the method comprising:

marking folders containing messages to be retained with a first flag;

determining if a folder is in the hierarchy belonging to the service root; deleting a message linked to a folder in the hierarchy belonging to the service root and not marked with the first flag; and examining the folder's ID and comparing the folder's ID to a predetermined criteria.

5. A computer program storage medium readable by a computing system and encoding a computer program of instructions for executing a computer process for selectively deleting messages linked to folders in a flat database on a handheld computer, the folders being arranged in an emulated hierarchy and having a service root associated with a server, the computer process comprising:

indicating folders that contain messages to be retained for use after disconnection from the server with an off-line flag by the handheld computer;

determining if a folder is in the hierarchy belonging to the service root; deleting a message linked to a folder in the hierarchy belonging to the service root and not marked with the off-line flag; and after determining if a folder is in the hierarchy, placing the result of the determination in a cache of the handheld computer.

6. The computer storage medium of claim 5, wherein the computer process further comprises:

after placing the result, comparing the result in the cache to a predetermined criteria.

7. A computer program storage medium readable by a computing system and encoding a computer program of instructions for executing a computer process for selectively deleting messages linked to folders in a flat database on a handheld computer, the folders being arranged in an emulated hierarchy and having a service root associated with a server, the computer process comprising:

indicating folders that contain messages to be retained for use after disconnection from the server with an off-line flag by the handheld computer;

determining if a folder is in the hierarchy belonging to the service root; and deleting a message linked to a folder in the hierarchy belonging to the service root and not marked with the off-line flag;

wherein determining if a folder is in the hierarchy belonging to the service root comprises:

examining a folder's ID and comparing the folder's ID to a predetermined criteria.

8. An apparatus for selectively deleting messages linked to folders in a flat database on a client device, the folders being arranged in an emulated hierarchy and having a service root associated with a server, the apparatus comprising:

an off-line module marking folders containing messages to be retained with an off-line flag;

a decision module determining if a folder is in the hierarchy belonging to the service hierarchy;

an erase module deleting a message linked to a folder in the hierarchy belonging to the service root and not marked with the first flag; and a cache module placing the result of the decision module in a cache of the client device.

9. An apparatus for selectively deleting messages linked to folders in a flat database on a client device, the folders being arranged in an emulated hierarchy and having a service root associated with a server, the apparatus comprising:

an off-line module marking folders containing messages to be retained with an off-line flag;

a decision module determining if a folder is in the hierarchy belonging to the service hierarchy;

an erase module deleting a message linked to a folder in the hierarchy belonging to the service root and not marked with the first flag; and a compare module comparing the result in the cache to a predetermined criteria.

10. A computer data signal embodied in a carrier wave readable by a computing system and encoding a computer program of instructions for executing a computer process for selectively deleting messages linked to folders in a flat database on a client device, the folders being arranged in an emulated hierarchy and having a service root connected to a server, the computer process comprising:

marking folders containing messages to be retained after disconnection from the server with an off-line flag;

determining if a folder is in the hierarchy belonging to the service root;

deleting a message linked to a folder in the hierarchy belonging to the service root and not marked with the off-line flag; and after determining if a folder is in the hierarchy, placing the result of the determination in a cache of the client device.

11. The computer data signal of claim 10, wherein the computer process further comprises:

after placing the result, comparing the result in the cache to a predetermined criteria.

12. A computer data signal embodied in a carrier wave readable by a computing system and encoding a computer program of instructions for executing a computer process for selectively deleting messages linked to folders in a flat database on a client device, the folders being arranged in an emulated hierarchy and having a service root connected to a server, the computer process comprising:

marking folders containing messages to be retained after disconnection from the server with an off-line flag;

determining if a folder is in the hierarchy belonging to the service root;

deleting a message linked to a folder in the hierarchy belonging to the service root and not marked with the off-line flag; and examining the folder's ID and comparing the folder's ID to a predetermined criteria.

\* \* \* \* \*